United States Patent [19]
Ade et al.

[11] Patent Number: 6,140,578
[45] Date of Patent: Oct. 31, 2000

[54] DRIVE HOUSING COVER

[75] Inventors: Rolf Ade, Bietigheim-Bissingen; Hubert Scheele, Weinsberg; Bernd Walther; Martin Csermak, both of Bietigheim-Bissingen, all of Germany

[73] Assignee: ITT Manufacturing Enterprises Inc., Wilmington, Del.

[21] Appl. No.: 09/101,060

[22] PCT Filed: Dec. 4, 1996

[86] PCT No.: PCT/EP96/05402

§ 371 Date: Sep. 28, 1998

§ 102(e) Date: Sep. 28, 1998

[87] PCT Pub. No.: WO97/24244

PCT Pub. Date: Jul. 10, 1997

[30] Foreign Application Priority Data

Dec. 27, 1995 [DE] Germany .......................... 195 48 823

[51] Int. Cl.[7] .................................................. H02G 3/08
[52] U.S. Cl. .............................. 174/50; 174/66; 220/3.8; 220/241
[58] Field of Search ....................... 174/50, 66; 220/241, 220/3.8

[56] References Cited

U.S. PATENT DOCUMENTS 5,243,130  9/1993  Kitagawa ................................. 174/50
5,621,189  4/1997  Dodds ..................................... 174/50

FOREIGN PATENT DOCUMENTS

3838285A1  5/1990  Germany .

*Primary Examiner*—Dean A. Reichard
*Attorney, Agent, or Firm*—J. Gordon Lewis

[57]  ABSTRACT

A lid for a gear box of a windscreen wiper is described, which includes a metallic base plate in a plastic envelope. The plastic envelope includes printed circuit conductors connected to contact lugs provided at the bottom side of the lid. The plastic layer extends substantially across the entire outer surface of the lid covering the edges of the lid in such a way that the bottom side of the plastic layer is flush with the bottom side of the base plate. In a preferred embodiment, the bottom side of the base plate is provided wit plastic material so that tension within the plastic material which occurs during cooling after injection molding does not result in warping or bending the base plate. The present invention results in a low weight, stable lid which is capable of providing support for the driven axis.

6 Claims, 3 Drawing Sheets

DRIVE HOUSING COVER

The present invention is concerned with a lid for a gear box of the type as set out in the preamble portion of claim 1.

Lids of this type are especially used with driving aggregates for windscreen wiper systems. The driving aggregate comprises an electromotor driving a worm gear. The gear is housed in a pot-shaped box to which the electromotor is laterally coupled. The worm gear is located within the box, with the driven shaft being externally guided through the bottom of the housing. The gear wheel is actuated by a worm, which is formed in the extension of the motor shaft.

The worm gear, on one side thereof facing the open side of the box, is provided with contact lines cooperating with contact lugs at the bottom side of the box lid. Contact lines and contact lugs form a so-called park position switch insuring that the windscreen wiper driven by the aggregate also after disconnection of the main switch be supplied with energy until the windscreen wipers have reached their parking position at the bottom edge of the windscreen.

The contact lugs, through printed conductors extending along the outer side of the lid, are supplied with power, with the printed conductors being embedded in a plastic layer injection-molded to the lid and, as a rule, having a cross-section in the form of a plug.

Normally, the said plastic layer has a dimension sufficient to cover or accommodate the printed conductors.

The side walls forming the edge of the plastic layer are at right angles on the outer face of the metallic lid of the gear box.

This arrangement has only little protection against corrosion. The different heat exchange coefficients of plastics and metal result in that at extreme temperature fluctuations to which the aggregate is exposed within the vehicle, the edge of the plastic layer separates from the lid thereby permitting the ingress of dirt and rain water. Moreover, the metallic lid must be extremely stable in order that tensions occurring within the plastic do not result in a deformation of the lid.

It is, therefore, the object of the invention to provide a lid adequately protected against corrosion, being of a sufficient stability and having a weight that is not excessively high.

This problem, in the practice of the invention, is solved in that the plastic layer so expands across the outer face of the base plate that the plastic layer overlaps the base plate in at least two marginal segments, with the bottom edge of the plastic layer, within the said segments, being flush with the bottom side of the base plate, and that the marginal segments overlapped by the plastic layer are apart from one another by at least 90 degrees, measured by the volume of the base plate.

To achieve an adequate stability of the combination of plastic layer and metallic base plate, the extension of the overlapped marginal segments should be at least 90 degrees, if not 180 or even 270 degrees.

As a consequence thereof, the individual sections in which an overlap of the base plate occurs, are passing over one into the other, forming a frame to embrace the metallic plate at least in part if not in full.

This frame-type construction, in addition, results in that the transition between plastic layer and metal plate occurs at the bottom side of the base plate covered by the bearing edge of the gear box.

To achieve a particularly intimate connection between the plastic layer and the metal base plate provision can be made to the effect that the same, at the bottom side thereof, includes recesses open at the edge engaged by the plastic layer, thereby seizing the edge at these points in U-shaped manner.

In order to avoid as far as possible the ingress of dirt and rain water, provision can be made to the effect that the layer of plastic material almost completely covers the outer side of the base plate.

In that case it is favorable to provide extended plastic faces also on the bottom side of the base plate to generate a certain counter-tension in order to prevent the base plate from deforming during cooling of the plastic layer after injection-molding.

The base plate includes orifices the edges of which are embraced by the plastic layer, with a connection between the plastic layer on the outer side and the plastic layer at the inner side of the base plate being established through these orifices. At the same time the said openings serve to pass electrically conducting bridges between the printed conductors on the outer side of the base plate and the contact lugs at the bottom side.

As a rule, three contact lugs are required for a park position switch. It is suggested to uniformly distribute these contact lugs circumferentially across the base plate so that the compressive forces exerted by the contact lines on the worm gear or an indexing plate, respectively, are applied free of momentum.

The lid is secured to the box edge by means of rivets or nuts, for which purpose the base plate is provided with holes for the passage of the rivets or nuts.

To provide an adequate sealing at this point, it is suggested that the plastic layer concentrically surrounds the said holes, with the inner diameter of the holes in the plastic material corresponding to the outer diameter of the nut or rivet head. The head can sealingly abut the inner edge of the holes in the plastic layer.

To achieve a certain flexibility of the plastic layer it is suggested that the plastic layer in the area of the holes be made thinner in the form of thin punched plates, thereby enabling the rivet tool to be more easily applied.

Another way of sealing the mounting holes resides in that the plastic material which is at the bottom side of the base plate extends toward the holes to engage the same in sleeve-type manner, with the inner diameter of the sleeve corresponding to the outer diameter of the nut or rivet shaft, with the sealing being effected between sleeve and shaft.

Preferably, the center at the inner side of the base plate is clear of plastic material so that the said area can serve as a start-off face for the driven shaft.

The invention will now be described in closer detail with reference to a variety of drawings, wherein FIG. 1 is a sectional view of a screen wiper gear, taken along the driven shaft;

Figure 1:
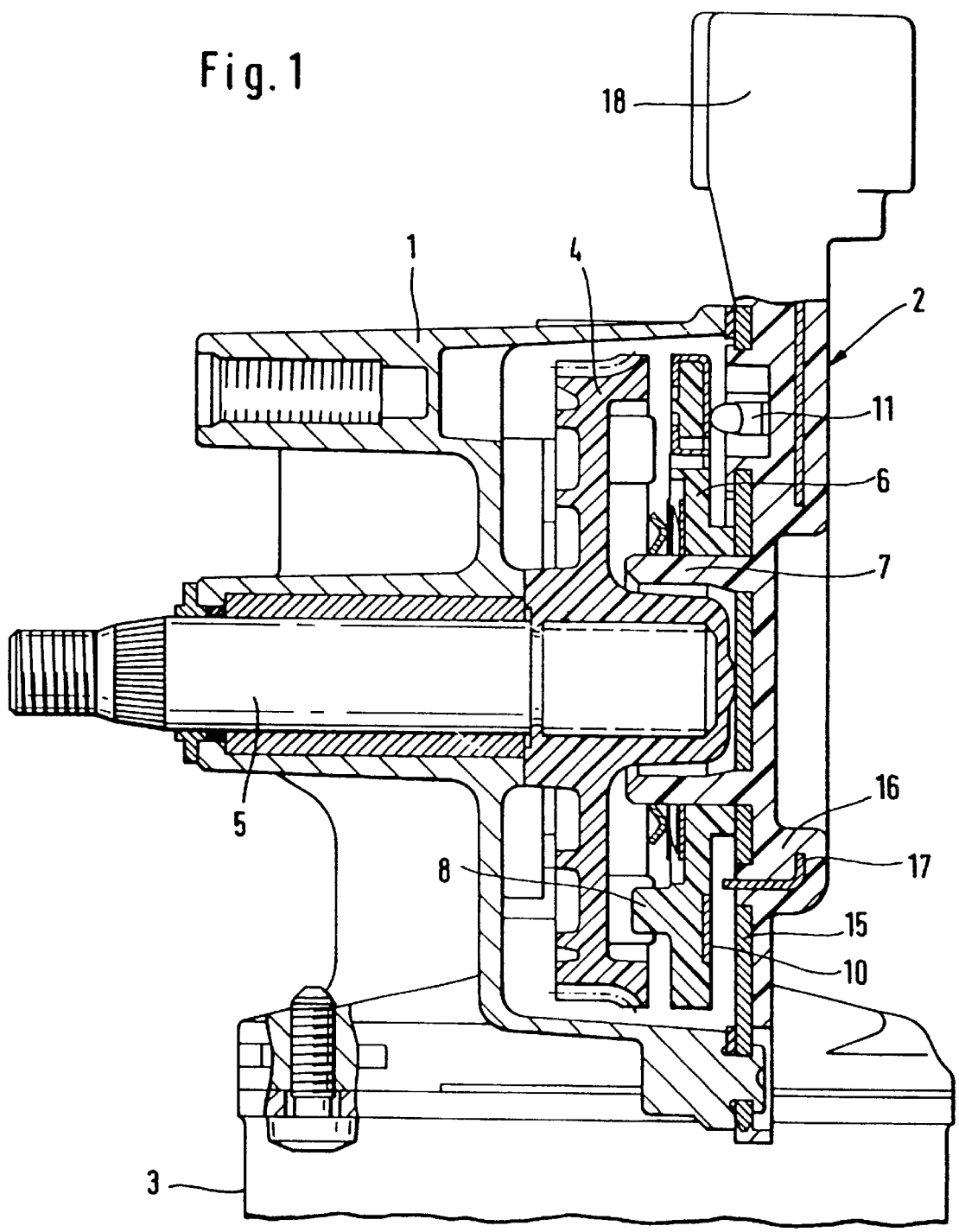

Reference is made to FIG. 1. The gear box comprises a box pot 1 and a lid 2. Laterally flanged to the box pot is a motor 3, the motor shaft of which (not shown) extends into the box pot and is formed as a worm in engagement with the toothing of the worm gear 4 as shown. The worm gear 4 in its radial extension approximately corresponds to the inner diameter of the box pot 1. A driven shaft 5 is guided through the bottom of the box pot, with the worm gear being rigidly connected to the end of the driven shaft 5 which end protrudes into the box pot. An indexing disk 6 is provided in a manner axially displaced over the worm gear 4, with the disk 6 being formed as a punched plate which is pivotally arranged on a sleeve-type extension 7 on the lid. The indexing disk 6 is coupled to the worm gear 4 via a follower means 8. The follower means 8 is so formed that upon rotation of the worm gear in one direction, the indexing disk is entrained, while when rotated in the other direction, the indexing disk remains stationary.

Applied to the outer side of the indexing disk 6 facing the open side of the gear pot 1, are concentrically extending contact lines 10 which, in part, are discontinued. The said contact lines 10 cooperate with contact tags 11 secured to the bottom side of the lid 2. The lid 2 comprises a metallic base plate 15 the extension of which corresponds to the opening of the gear pot 1; also, it is provided with a plurality of breaks. Provided on the outer side of the metallic base plate is a plastic layer 16 in which printed conductors 17 extend leading to a plug 18 the casing of which is integrally formed with the plastic layer and which, conversely, establish connections to the contact flags 11.

In addition, the printed conductors 17 insure the power supply to the electromotor. For this purpose, the printed conductors 17 (not shown in any detail) include contact pins protruding from the bottom side of the lid and conforming to corresponding plugs arranged within the gear box and being connected to the electromotor.

Figure 2:
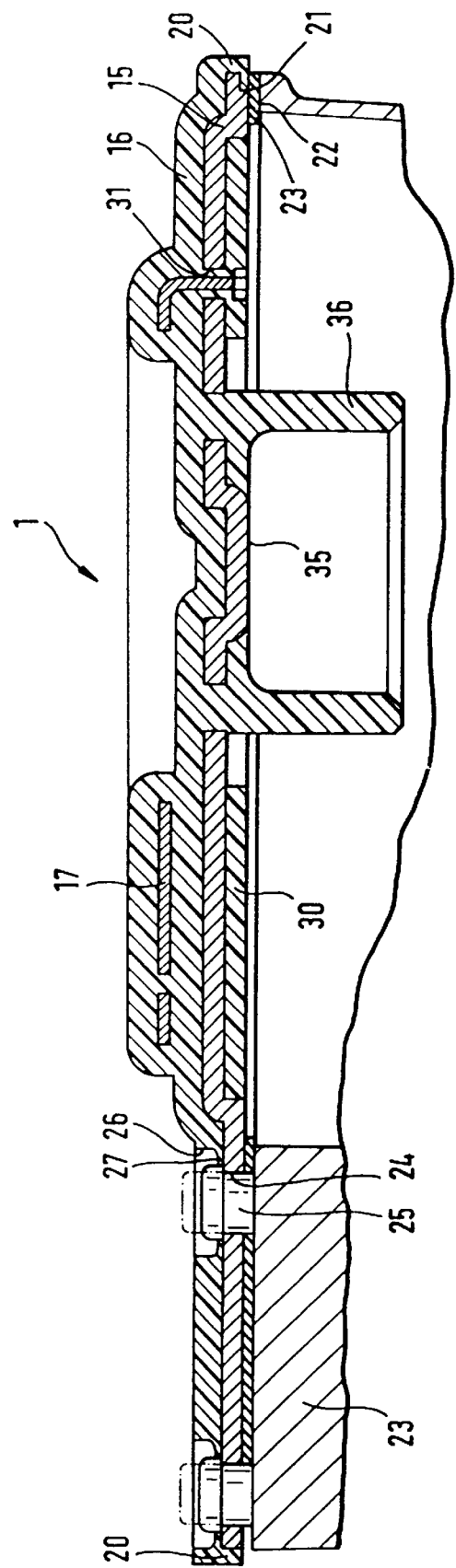
FIG. 2 shows the basic construction of the gear box lid.

FIG. 2 is a sectional view, in enlarged scale, of the box lid 2.

The illustration is not line with a concrete section through the lid of FIG. 1 but only serves to explain the design of the lid 1.

The main component of the lid 2 is a metallic base plate 15 to the outer side of which is applied or injected a plastic layer 16.

The said plastic layer 16 covers the whole of the outer side of the base plate 15. Printed conductors 17 are embedded therein in the form of a flat metal grid which extends at a distance in parallel to the base plate 15. The plastic layer 16 with rim 20 thereof overlaps the edge of the base plate 15 so that the bottom edge of the rim 20 is flush with the bottom side of the base plate 15. The sections of the base plate 15 which, in this way, are seized by the rim of the plastic layer 16 should, based on the volume of the base plate, be large-sized. It is desirable that the overlapping plastic rim 20 completely embraces the base plate like a frame, thereby imparting to the box a corresponding stability. Also, it will be achieved thereby that the joint 21 between the plastic layer and the base plate 15 will either directly abut the rim 22 of the box pot 1, or will be provided on a sealant 23 located between the rim 22 and the lid.

Hence, no direct ingress of dirt or rainwater can reach the joint 21, thereby reducing the corrosion risk.

Another zone of trouble in terms of denseness and corrosion resistance are the points at which the box lid 2 is riveted or screwed to the box pot 1. For this purpose, the base plate 15 has holes 24 plugged into which are rivet heads 25 formed on the rim 22 of the box pot 1. The part of the rivet head 25 projecting from the mounting hole 24 will be pressed down, placing itself on the outer side of the base plate 15, with the expanding rivet head holding the base plate 15 on the rim 22 of the box.

The plastic layer 16, in the area of the mounting holes 24, is also discontinued in the form of perforations, with the diameter thereof corresponding to the diameter of the rivet tool. A thin punched plate 27 is, therefore, molded to the rim of the hole 26, the inner diameter of which corresponds to the outer diameter of the pressed-down rivet head. At the same time, it is of such a flat configuration that the rivet tool can seize the rivet head.

As conveyed by FIG. 2, faces extending along the bottom side of the metal plate 15 are also covered by a plastic layer 30, with the connection between the plastic layer 16 on the outer side of the base plate 15 and the plastic layer 30 on the bottom side being effected through breaks 31 provided in the base plate 15 which also serve to guide the printed conductors 17 to the contact flags 11 on the bottom side of the box lid 2.

In the center of the lid, a face 35 is kept clear of plastic. The driven shaft of the gear can axially support itself on that face 35. The face 35 is concentrically surrounded by a sleeve 36 on the outer side of which the indexing disk is pivotally arranged. To that extent, either the outer side of the sleeve 36 or the inner contour of the indexing disk 6 can be formed as a polygon so that sleeve and indexing disk have only pointed contact. Lubricant can deposit in the free spaces between the contact points.

Figure 3:
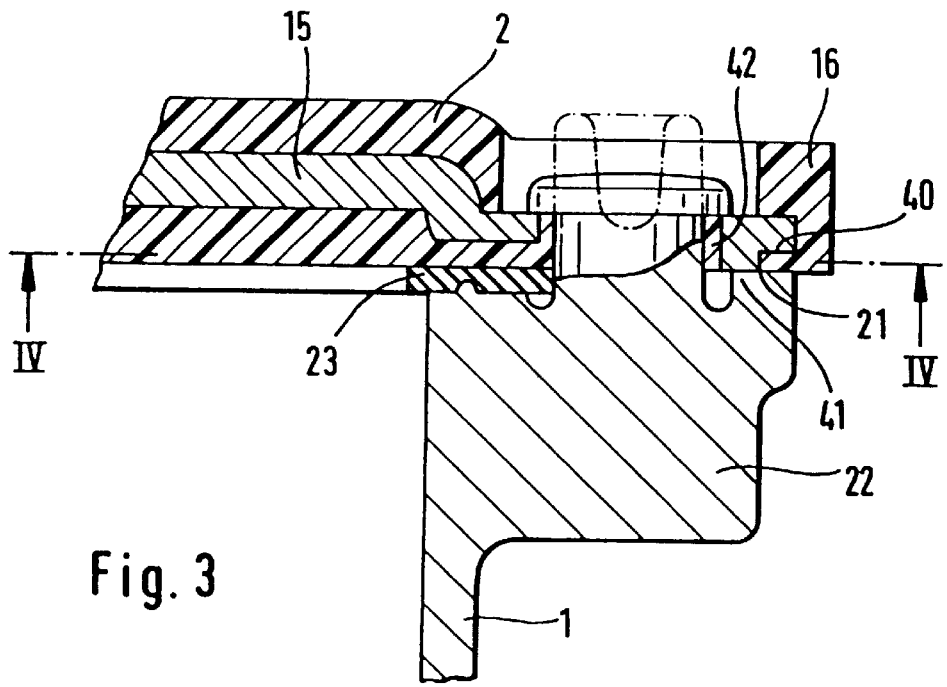
FIGS. 3, 4 show a detail of the lid.
Figure 4:
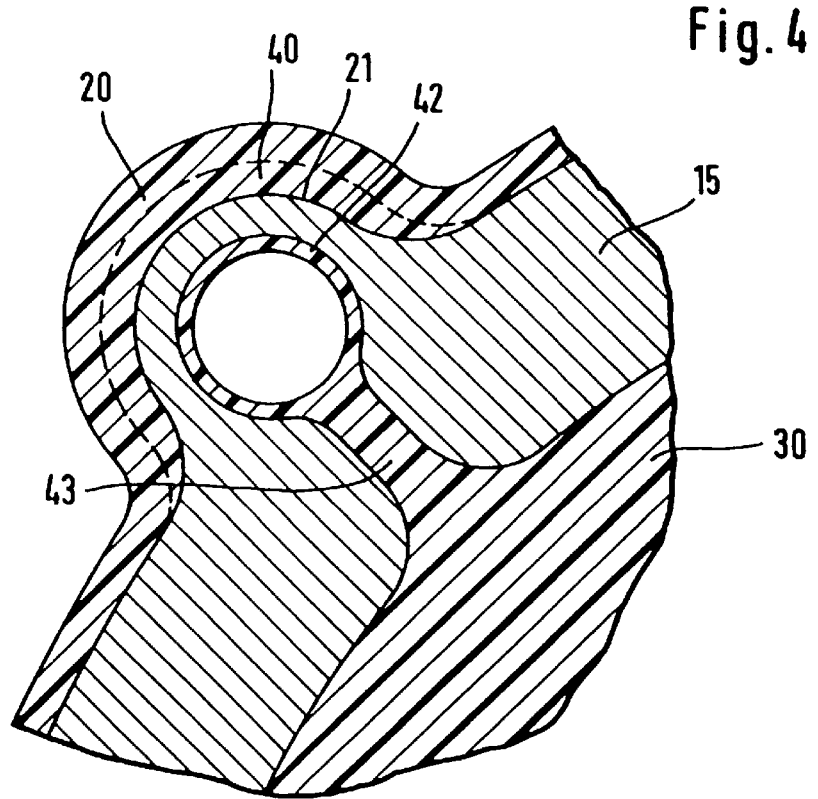

FIG. 3 shows another point of connection between lid 2 and pot 1 and rim 22 thereof, respectively. FIG. 4 is a sectional view taken along the line IV—IV in FIG. 3. Moreover, it is shown that the base plate 15 includes recesses 40 open at the edge that are filled with plastic and that are connected to the plastic layer 16 at the outer side of the lid. The plastic layer 16 will thereby not only overlap the edge of the base plate 15 but will rather embrace the same, thereby establishing a safe connection between plastic layer 16 and base plate 15. In addition, the joint between the rim of the base plate 15 and the plastic layer 16, at this point is meandering. This is particularly interesting at the points at which the lid 2 is placed on the rim of the box 1, with no gasket inserted therebetween.

A configuration of this type is of importance at those points at which the box rim has raised portions. The raised portions have the function described hereinafter.

To align the lid of the box with the pot it is adequate for the lid to be supported at some points located at the same level, thereby facilitating the preparation of the corresponding mold. The operator will then only have to see to it that the points on which the lid is supported, lie at the same level. This will be easier to realize than to achieve a planar alignment of the entire rim.

A squeezable sealant 23 is provided in the areas in which the lid is not supported on the raised portions. The sealant fills the space between the rim of the casing and the lid which in view of the raised portions 41 has a certain distance from the rim.

Overlapping of the plastic layer with recesses open at the edge, hence, especially occurs in the areas in which the base plate is directly placed on the corresponding raised portions 41.

FIGS. 3 and 4, moreover, show another sealing capability of the rivet shafts. For this purpose, the plastic layer 30, at the bottom side of the base plate 15, includes a sleeve-type expansion 42 extending from the bottom into the mounting holes, abutting at the side walls thereof. The inner diameter of the sleeve corresponds to the outer diameter of the rivet shaft. The pressed-down rivet head overlaps the sleeve, abutting such areas of the outer side of the base plate as are clear of plastic material.

The sleeve, through a bridge 43 (see FIG. 4) is connected to the extended areas of the plastic layer 30 at the bottom side. The base plate 15, for this purse, includes a corresponding passageway.

What is claimed is:

1. A lid for a gear box, comprising:
   a metallic base plate,
   a plastic layer arranged on an outer side of the base plate, wherein said plastic layer includes electrically conductive metal lines embedded in said plastic layer, said metal lines serving for supplying power wherein the plastic layer extends across an outer face of the base plate such that the plastic layer overlaps the base plate, wherein a bottom edge of the plastic layer, at these points of overlap, is flush with a bottom side of the base plate wherein the base plate, at a bottom side thereof, includes recesses open at an edge of said base plate which are engaged by the plastic layer.

2. A lid according to claim 1, wherein the base plate is provided with openings having edges which are seized by the plastic layer.

3. A lid according to claim 2, wherein the plastic layer, at an outer side thereof, forms an opening concentric to one of said base plate openings is provided with holes.

4. A lid according to claim 3, wherein said plastic layer forms a sleeve within each of said base plate recesses.

5. A lid for a gear box, comprising:

a metallic base plate, a plastic layer arranged on an outer side of the base plate, wherein said plastic layer includes electrically conductive metal lines embedded in said plastic, said metal lines serving for supplying power wherein the plastic layer extends across an outer face of the base plate such that the plastic layer overlaps the base plate, wherein a bottom edge of the plastic layer, at these points of overlap, is flush with a bottom side of the base plate, wherein the plastic layer substantially covers an outer side of the base plate, wherein the base plate is provided with openings having edges which are seized by the plastic layer.

6. A lid for a gear box, comprising:

a metallic base plate and a plastic layer arranged on an outer side of the base plate, wherein said plastic layer includes electrically conductive metal lines embedded in said plastic, said metal lines serving for supplying power wherein the plastic layer extends across an outer face of the base plate such that the plastic layer overlaps the base plate, wherein a bottom edge of the plastic layer, at these points of overlap, is flush with a bottom side of the base plate, wherein said metallic base plate includes mounting holes, and wherein the plastic layer, at a bottom side of the base plate, extends into the mounting holes, and in the form of a sleeve, extends to an upper edge of the base plate.

* * * * *